Aug. 4, 1959     R. T. BELKE     2,897,622
FISHING RIGS
Filed May 31, 1956     2 Sheets-Sheet 1
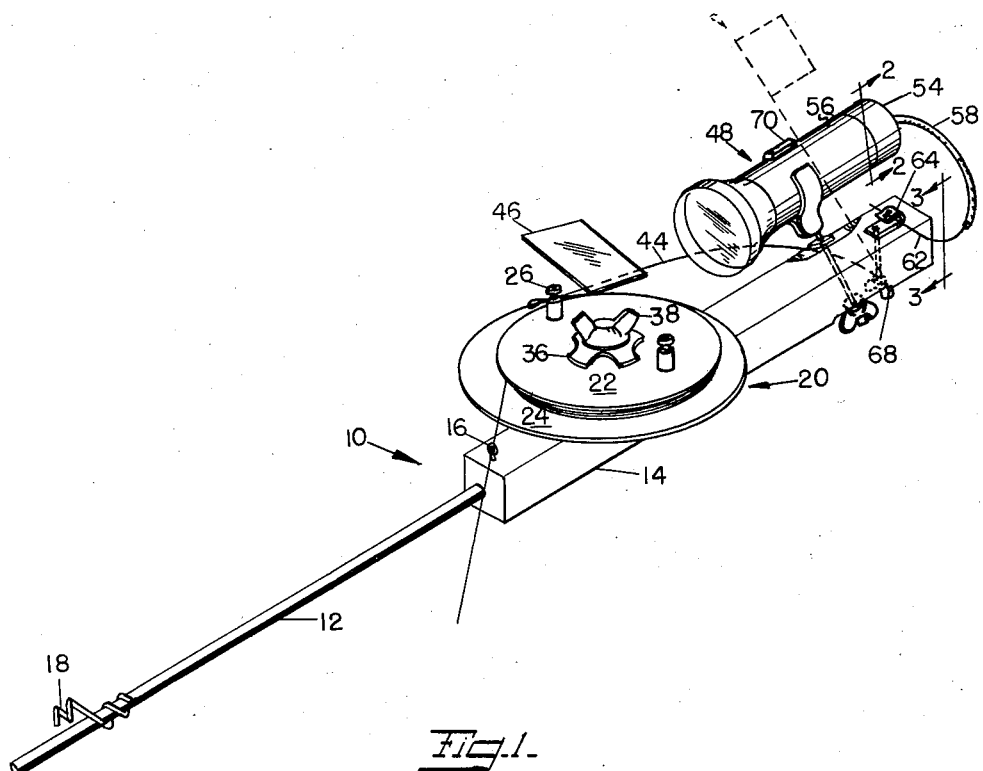
*Fig. 1.*
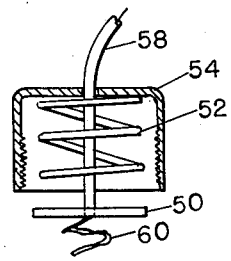
*Fig. 2.*    *Fig. 3.*
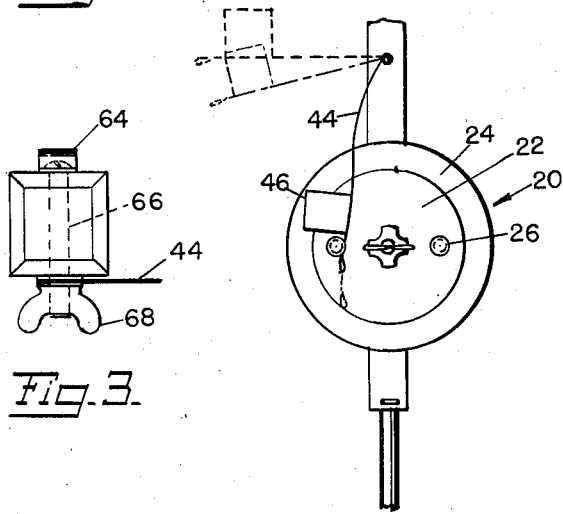
*Fig. 4.*
INVENTOR.
RALPH T. BELKE
BY 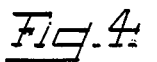
ATTORNEY.

Aug. 4, 1959     R. T. BELKE     2,897,622
FISHING RIGS
Filed May 31, 1956     2 Sheets-Sheet 2
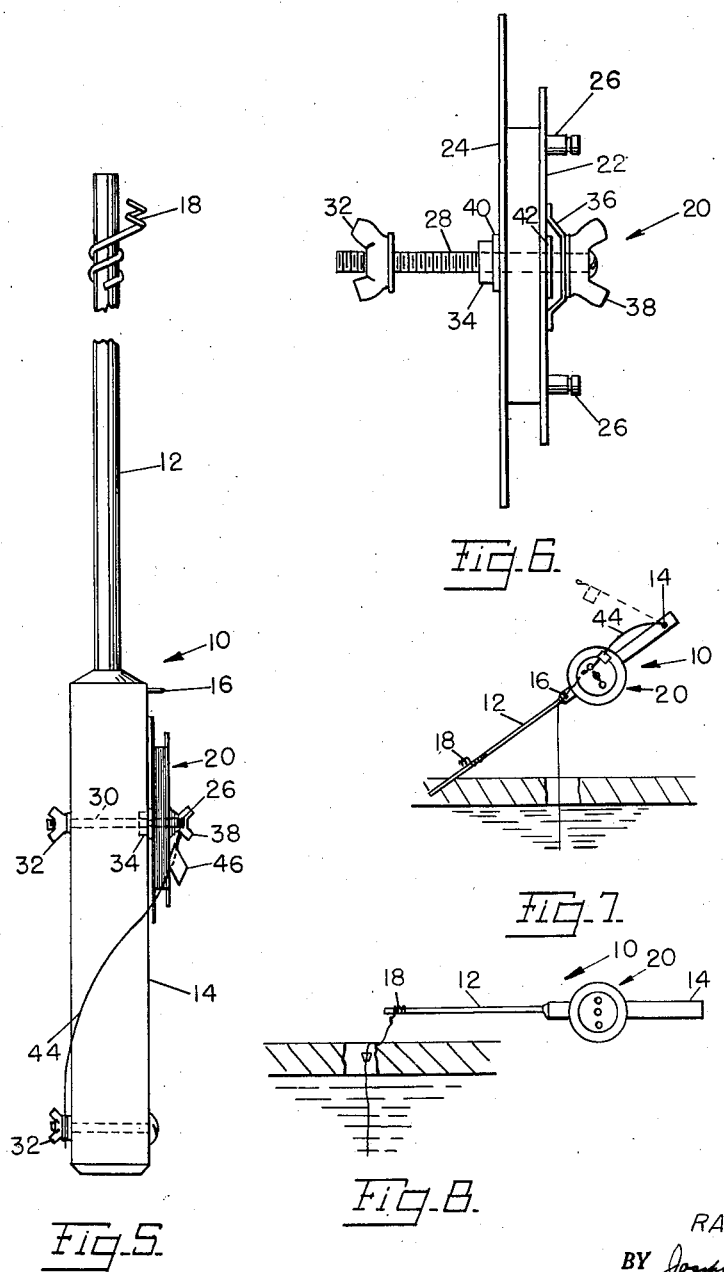
INVENTOR.
RALPH T. BELKE
BY Joseph G. Werner,
ATTORNEY United States Patent Office
2,897,622
Patented Aug. 4, 1959

2,897,622
FISHING RIGS
Ralph T. Belke, Schofield, Wis.
Application May 31, 1956, Serial No. 588,421
2 Claims. (Cl. 43—17)

The present invention relates to improvements in fishing rigs of the character adapted primarily for ice fishing and/or fishing at night.

A principal object of the invention is to provide a device having numerous novel features of advantage which in their combination render the device desirable for use under a wide variety of conditions encountered by fishermen.

Among the various specific objects and advantages of the invention are: the provision of improved signalling means to indicate a fish bite, effectively operable in both day and night and adjustable in accordance with the size or the kind of fishing being performed; the provision of illuminating means actuated when a fish is hooked and secured to the rod so that both hands of the fisherman may remain free for operation of the rig and removal of the fish from the hook; the provision of an improved rod which may be held manually or supported by itself in operative position, the said rod including novel line guide means adjustable along the length of the rod, and the provision of an improved reel and adjustable line drag which tends to prevent fouling of the line and which may be supported on the rod handle in a simple and secure manner.

Other objects and advantages of the invention will be apparent from the following detailed description taken in conjunction with the accompanying drawings wherein a preferred embodiment of the principles of the invention has been selected for exemplification.

In the drawings:

Fig. 1 is a perspective view of a fishing rig embodying the improvements of the present invention;

Fig. 2 is an enlarged sectional view taken on the line 2—2 of Fig. 1 and showing the base cap of the flash light;

Fig. 3 is an enlarged end view of the rod as indicated by the line 3—3 in Fig. 1 and showing the connection of the signal wire to the clip for the insulated current conducting wire leading to the flash light base;

Fig. 4 is a fragmentary side elevational view showing the reel and signal and indicating in broken lines the adjustable manner in which the signal wire may be set;

Fig. 5 is a top plan view of the fishing rig having portions thereof partly broken away and with the flash light attachment removed;

Fig. 6 is an enlarged end view of the reel and rod handle attachment bolt;

Fig. 7 is a side elevational view showing one manner in which the fishing rig may be used; and Fig. 8 is a view similar to Fig. 7 but showing another manner in which the fishing rig may be used.

Referring more particularly to the drawings, wherein like numerals refer to like parts, the fishing rig indicated in its entirety at 10 includes a rod portion 12 and a handle or butt portion 14. As shown a stationary line eye or guide 16 is secured to the forward end of the handle 14 and a movable guide 18 in the form of a coiled spring wire is provided for adjustable positioning at any desired point along the rod 12 as indicated in Figs. 7 and 8.

The line reel or spool 20 includes an outer disc 22, an inner disc 24 of relatively greater diameter which tends to prevent fouling of the line on the reel and handles 26 for manual operation of the reel or spool extend outwardly of the disc 22. An elongated stove bolt 28 extends axially through the spool 20 and the threaded portion thereof projects through a bore 30 in the rig handle 14 for engagement with a wing nut or the like 32 for securing the spool upon the rig handle 14. A square nut 34 threaded to the body portion of the bolt 28 seats in a counterbore provided in the rig handle 14 to prevent rotation of the bolt 28.

To adjust the drag or tension of the spool 20, a formed spring 36, preferably of tempered brass, is supported at the outer end portion of the bolt 28 and the compression thereof against the spool may be adjusted by the outer wing nut 38 or by turning of the head of the bolt 28. Inner and outer washers 40 and 42 bearing against the discs 24 and 22, respectively, are preferably also provided.

The signal to indicate a bite or that a fish has taken the bait and is tugging or swimming away with the line against the drag of the spool 20 comprises a spring wire 44 having one end thereof secured to the rig handle 14 with the outer free end thereof tensioned under spool retention means such as one of the spool handles 26 so that, as the spool tends to rotate sufficiently to release the handle 26, the wire 44 springs to an upright position to display the flag 46 or similar indicating means. It will be apparent that release of the signal may be controlled by adjustment of the spool drag, by adjusting the position of the wire relative to the rig handle 14 as indicated in Fig. 4, or by relative adjustment of the position of the handle 26 with respect to the length of the wire 44.

In lieu of or in addition to a flag or the like 46 the light signal or illuminating means in the form of a flashlight 48 as shown in Fig. 1 may be provided. In this modification of the invention, the base portion of an ordinary flashlight is altered to include an insulating washer 50 of fiber or the like, as shown in Fig. 2, to prevent the uusal spring 52 in the base cap 54 of the flashlight from making its normal contact between the base of the battery and the flashlight case 56. Such contact instead is made by an insulated wire 58 having the insulation removed from one end thereof 60 which projects through the insulating washer 50 into contact with the base of the battery and from the opposed end 62 thereof which is engaged in a clip 64. The clip 64 is secured to the rig handle 14 by one end of a conducting bolt 66 which extends through the handle to engage a wing nut 68 to secure the end of the signal wire 44. The case 56 of the flashlight 48 and the signal wire 44 are relatively positioned, as will be apparent from Figs. 1 and 5, so that when the wire 44 is set or tensioned against a spool handle 26 the wire is out of contact with the case 56 but when the wire 44 is tripped or released from the spool 20 and springs into upright position it bears against the case 56 to close the circuit through the battery thus to energize the flashlight when its usual switch 70 is in the "on" position.

The flashlight 48 may be supported on the rig handle 14 by any suitable clamping means and preferably is adjustably supported so as to insure firm electric current conducting contact with the flexible signal wire 44, such as by the clamping means shown in Fig. 1. It will be apparent that the flashlight 48 provides not only a visual signal, particularly useful when a plurality of rigs are set out at night such as over ice holes, but also provides automatic illumination when needed for taking of a fish without interfering with normal two-handed operation of the rig.

It is to be understood that the present invention is not

I claim:

1. A fishing rod and reel comprising an elongated handle for said rod, a shaft supported on said handle and projecting therefrom, the axes of said handle and said shaft being substantially perpendicular to one another, a spool rotatably mounted on the projecting portion of said shaft, said spool having a central drum for storing line between two end discs, said discs being of substantially greater diameter than said drum and the disc closest to said handle being of substantially greater diameter than the other disc, a winding nob projecting from the surface of said other disc, a conductive spring wire supported at one end on said handle, detent means on said nob for retaining said wire in a deflected position for a predetermined rotative position of said reel, a battery flashlight having an exposed metallic barrel, means for removably mounting said flashlight on said handle in position for said barrel to be contacted by said wire only in its undeflected position, and an electric circuit between the battery of said flashlight and the supported end of said spring wire to light said flashlight when said detent releases said wire to permit the same to spring to said undeflected position.

2. A fishing rod and reel comprising an elongated handle at one end of said rod, a shaft supported on said handle and projecting therefrom, the axes of said handle and said shaft being substantially perpendicular to one another, a spool rotatably mounted on the projecting portion of said shaft, said spool having a central drum for storing line between two end discs, said discs being of substantially greater diameter than said drum and the disc closest to said handle being of substantially greater diameter than said other disc, a winding nob projecting from the surface of said other disc, a conductive spring wire supported at one end on said handle, detent means on said nob for retaining said wire in a deflected position for a predetermined rotative position of said reel, a battery flashlight having an exposed metallic barrel, means for removably mounting said flashlight on said handle with the illumination directed toward the remote end of said rod and in position for said barrel to be contacted by said wire only in its undeflected position, and an electric circuit between the battery of said flashlight and the supported end of said spring wire to light said flashlight when said detent releases said wire to permit the same to spring to said undeflected position.

References Cited in the file of this patent

UNITED STATES PATENTS

| | | |
|---|---|---|
| 1,230,467 | Ehrler | June 19, 1917 |
| 2,593,989 | Crandall | Apr. 22, 1952 |
| 2,628,444 | Oak | Feb. 17, 1953 |
| 2,634,920 | Dunn | Apr. 14, 1953 |
| 2,721,412 | Smiley | Oct. 25, 1955 |
| 2,732,649 | Tuttle | Jan. 31, 1956 |
| 2,741,054 | Brundage | Apr. 10, 1956 |

FOREIGN PATENTS

| | | |
|---|---|---|
| 463,462 | Canada | Feb. 28, 1950 |
| 484,805 | Canada | July 15, 1952 |